United States Patent
Song et al.

(10) Patent No.: US 9,866,661 B2
(45) Date of Patent: Jan. 9, 2018

(54) DEFORMABLE MOBILE TERMINAL

(71) Applicant: LG ELECTRONICS INC., Seoul (KR)

(72) Inventors: Insu Song, Seoul (KR); Jaewook Lee, Seoul (KR); Seayoung Cho, Seoul (KR); Wooyong Kwon, Seoul (KR); Seyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/516,375

(22) PCT Filed: Jun. 18, 2015

(86) PCT No.: PCT/KR2015/006203
§ 371 (c)(1),
(2) Date: Mar. 31, 2017

(87) PCT Pub. No.: WO2016/056730
PCT Pub. Date: Apr. 14, 2016

(65) Prior Publication Data
US 2017/0310798 A1    Oct. 26, 2017

(30) Foreign Application Priority Data
Oct. 7, 2014 (KR) ........................ 10-2014-0134923

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01)

(58) Field of Classification Search
CPC ..... H04M 1/0268; G06F 1/1652; G09F 9/301
See application file for complete search history.

(56) References Cited

U.S. PATENT DOCUMENTS

| | | | |
|---|---|---|---|
| 2010/0156824 A1* | 6/2010 | Paleczny | G06F 3/016 345/173 |
| 2011/0115744 A1* | 5/2011 | Murayama | G06F 3/0414 345/174 |

(Continued)

FOREIGN PATENT DOCUMENTS

| | | |
|---|---|---|
| KR | 10-2011-0048640 | 5/2011 |
| KR | 10-2014-0049911 | 4/2014 |

(Continued)

OTHER PUBLICATIONS

English machine translation of KR 10-2014-0049911, Yu Gu Lee, Apr. 28, 2014.*

(Continued)

*Primary Examiner* — Devan Sandiford
(74) *Attorney, Agent, or Firm* — Lee, Hong, Degerman, Kang & Waimey PC

(57) ABSTRACT

Provided is a mobile terminal. The mobile terminal includes a display unit outputting an image, a front case seated on a front surface of the display unit, a rear case disposed at a rear side of the front case, and a leaf spring disposed between the front case and the rear case to provide an elastic force to the front case, thereby changing a curvature of the front case.

17 Claims, 12 Drawing Sheets

(56) References Cited

U.S. PATENT DOCUMENTS

| | | | | |
|---|---|---|---|---|
| 2014/0004906 | A1* | 1/2014 | Chi | H04B 1/38 455/566 |
| 2014/0133073 | A1* | 5/2014 | Ahn | H01L 51/5237 361/679.01 |
| 2014/0196254 | A1* | 7/2014 | Song | E05D 3/14 16/302 |
| 2014/0226275 | A1* | 8/2014 | Ko | G06F 1/1626 361/679.27 |
| 2015/0009125 | A1* | 1/2015 | Kim | G06F 3/0488 345/156 |
| 2015/0009635 | A1* | 1/2015 | Kang | G09F 9/301 361/749 |
| 2015/0055287 | A1* | 2/2015 | Seo | G06F 1/1652 361/679.27 |
| 2015/0138699 | A1* | 5/2015 | Yamazaki | G06F 1/163 361/679.03 |
| 2015/0212549 | A1* | 7/2015 | Shin | G02F 1/133308 361/679.26 |
| 2015/0241925 | A1* | 8/2015 | Seo | G06F 1/1652 361/679.27 |
| 2015/0241926 | A1* | 8/2015 | Park | G06F 3/016 345/173 |
| 2015/0378397 | A1* | 12/2015 | Park | G06F 1/1652 361/679.27 |
| 2016/0037625 | A1* | 2/2016 | Huitema | G09F 21/026 361/749 |
| 2016/0062410 | A1* | 3/2016 | Ko | G06F 1/163 361/679.03 |
| 2016/0127525 | A1* | 5/2016 | Lee | H04M 1/0279 455/575.1 |
| 2016/0135286 | A1* | 5/2016 | Hwang | H05K 1/189 361/720 |
| 2016/0147262 | A1* | 5/2016 | Lee | G06F 1/1626 345/173 |
| 2016/0191680 | A1* | 6/2016 | Jung | H04M 1/0241 455/575.1 |
| 2016/0195938 | A1* | 7/2016 | Kim | H04B 1/3827 345/156 |
| 2016/0212864 | A1* | 7/2016 | Lee | G06F 1/1652 |
| 2016/0313769 | A1* | 10/2016 | Yoshitani | G06F 3/167 |
| 2016/0324023 | A1* | 11/2016 | Kim | H04M 1/0268 |
| 2016/0327987 | A1* | 11/2016 | Huitema | G06F 1/1652 |
| 2016/0352878 | A1* | 12/2016 | Kim | G06F 1/1652 |

FOREIGN PATENT DOCUMENTS

| | | |
|---|---|---|
| KR | 10-2014-0091271 | 7/2014 |
| KR | 10-2014-0091276 | 7/2014 |
| KR | 10-2014-0099006 | 8/2014 |

OTHER PUBLICATIONS

PCT International Application No. PCT/KR2015/006203, International Search Report dated Oct. 8, 2015, 4 pages.

* cited by examiner

【Figure 1】
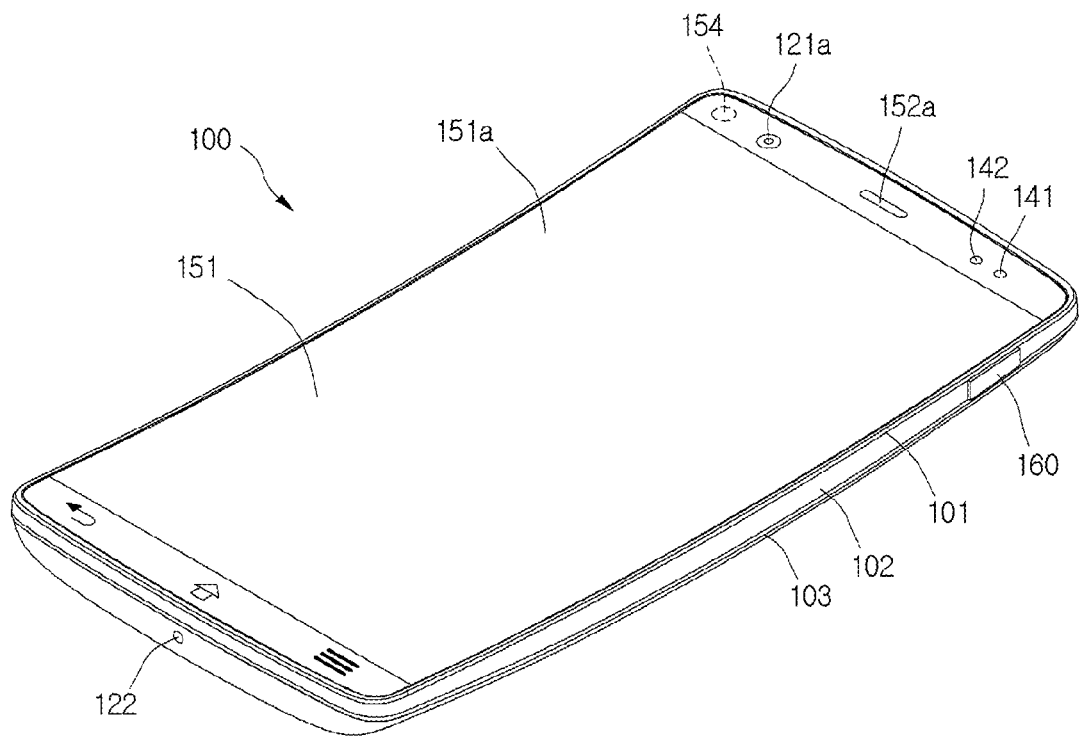

【Figure 2】
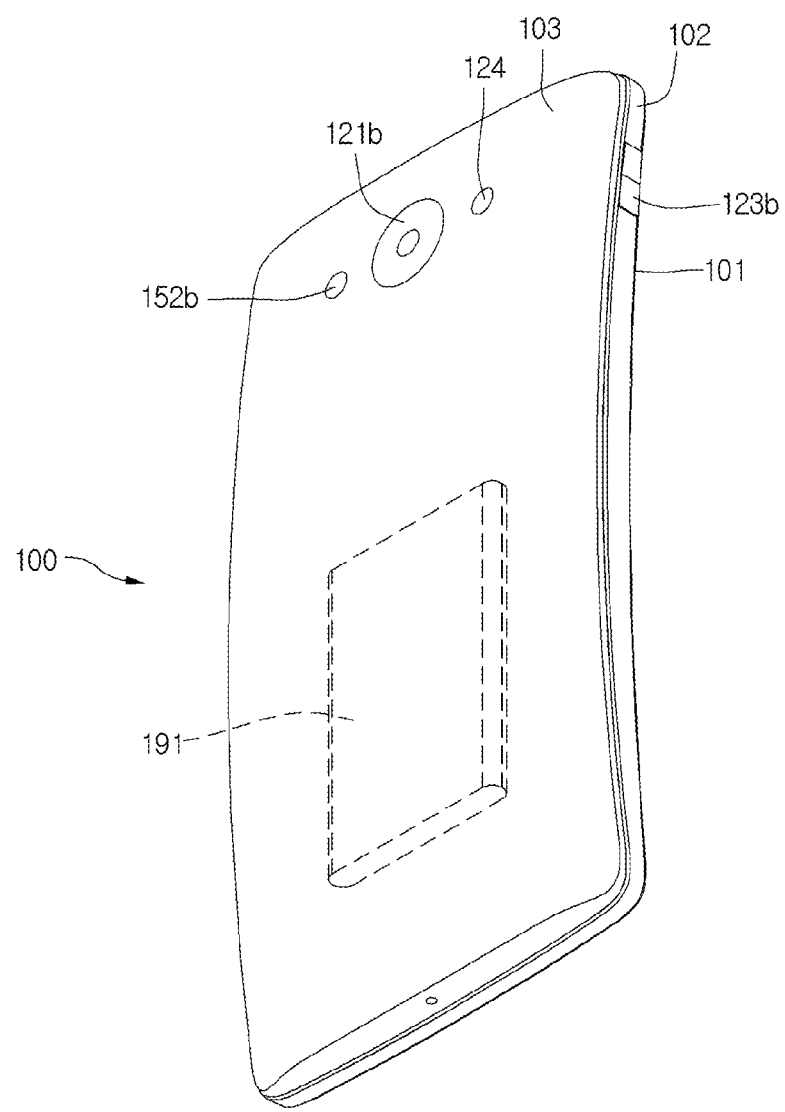

[Figure 3]
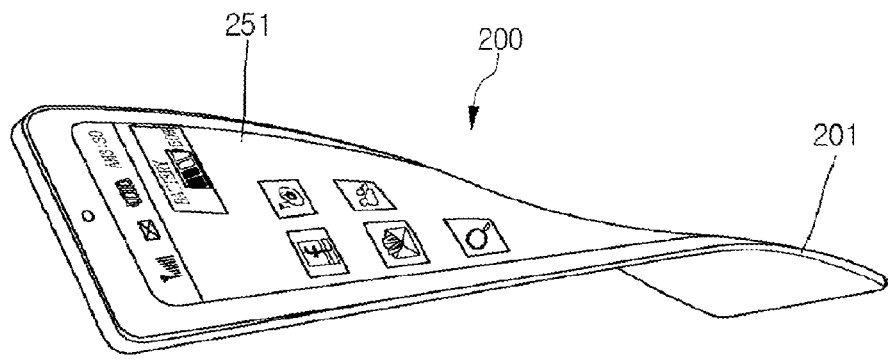
[Figure 4]
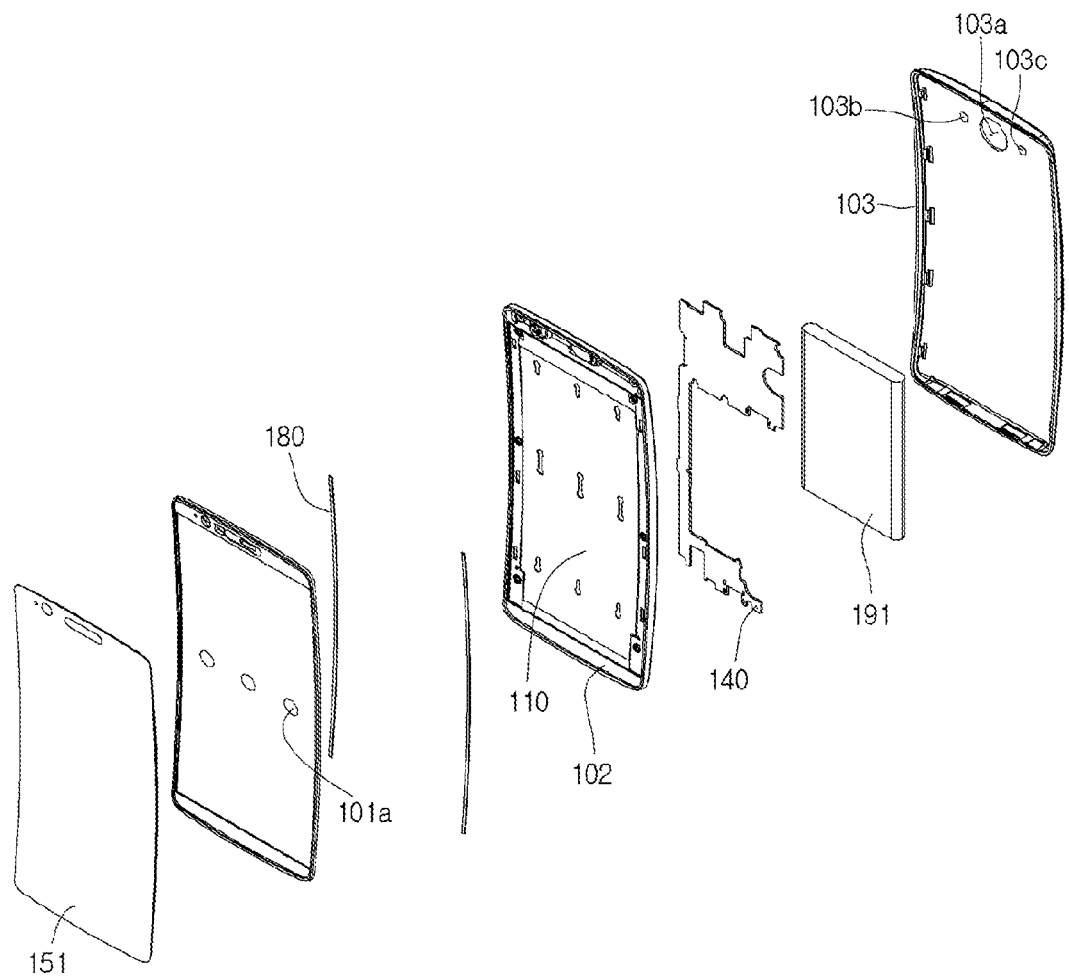

【Figure 5】
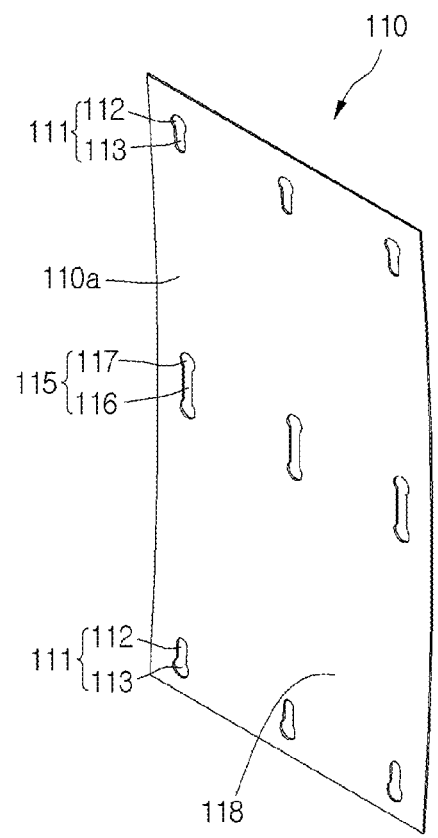
【Figure 6】
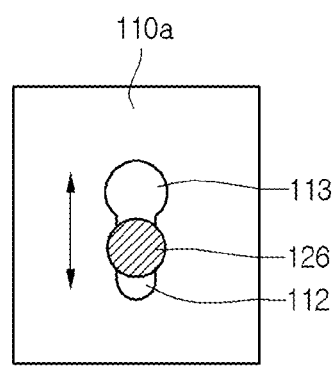

[Figure 7]
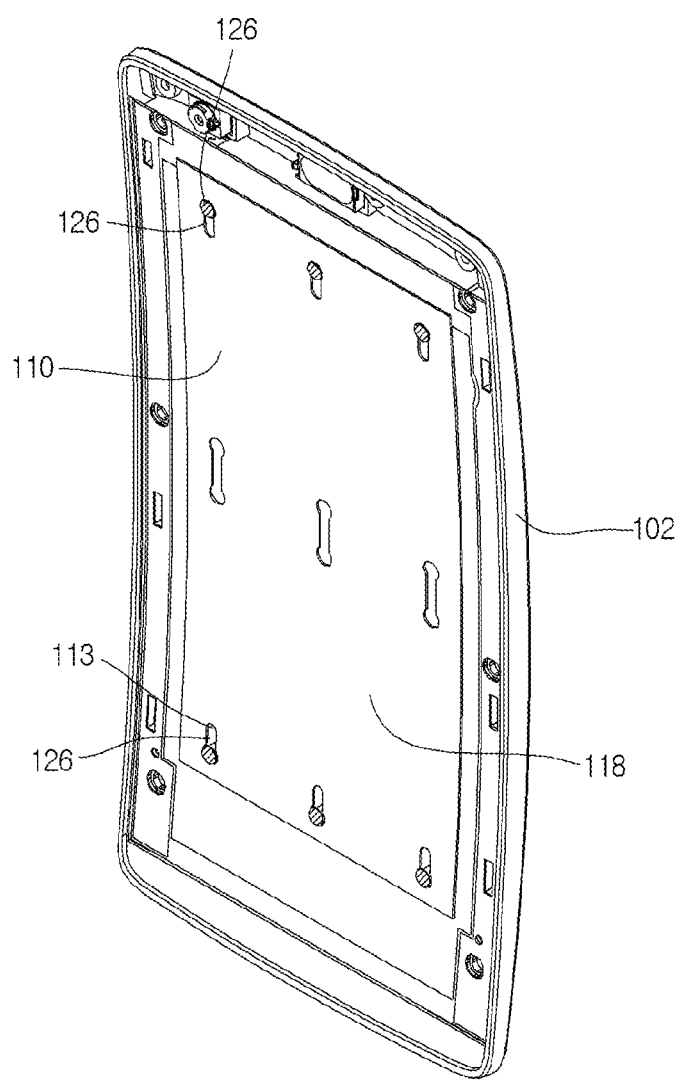

【Figure 8】
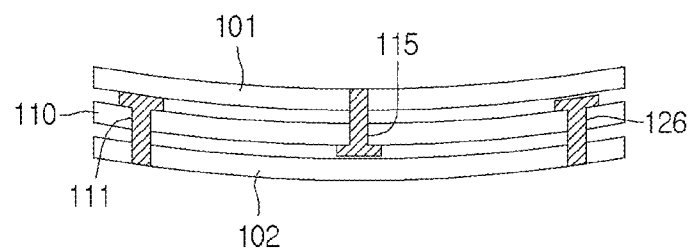
【Figure 9】
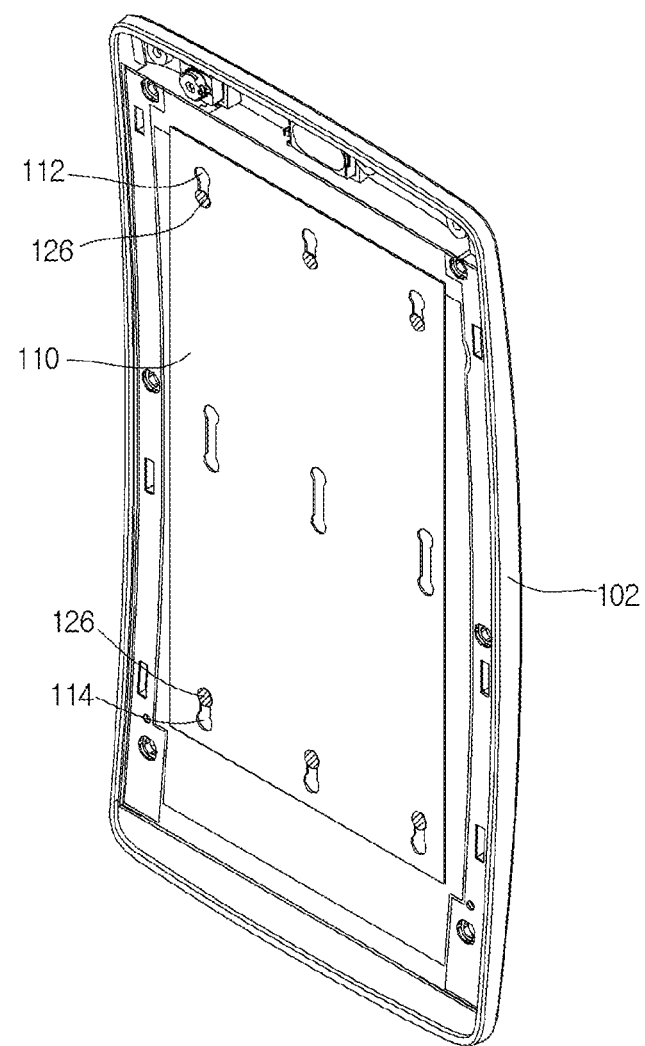

【Figure 10】
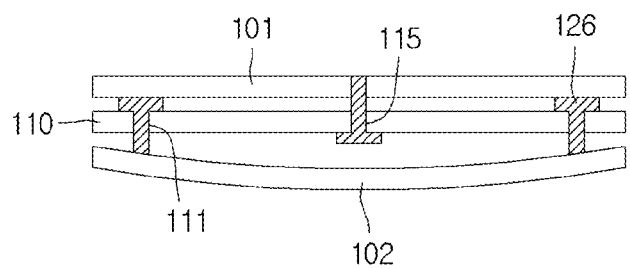
【Figure 11】
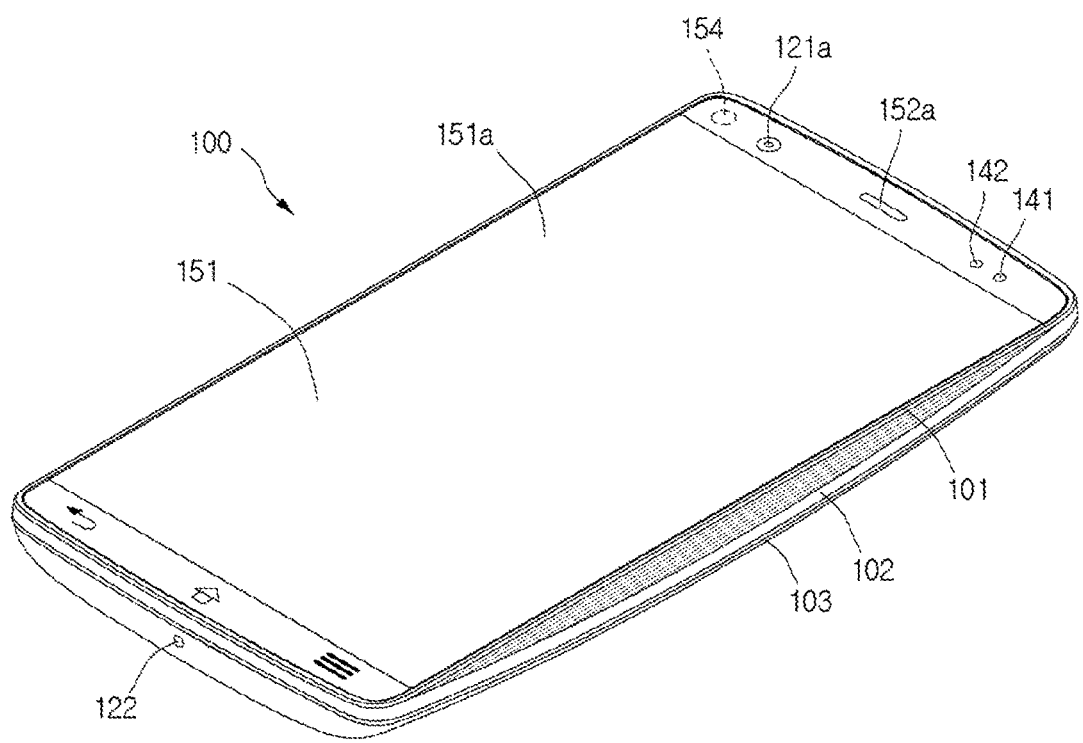

【Figure 12】
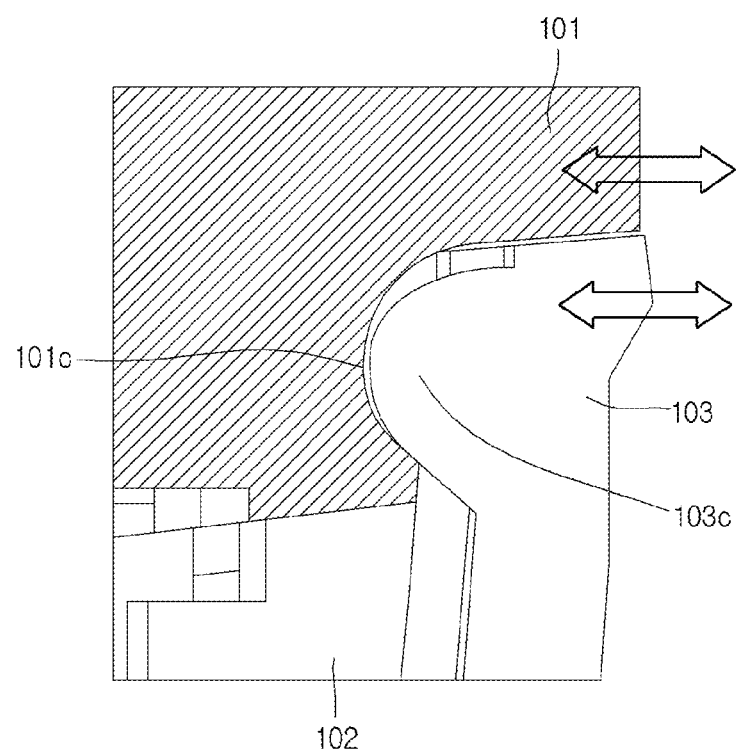

【Figure 13】
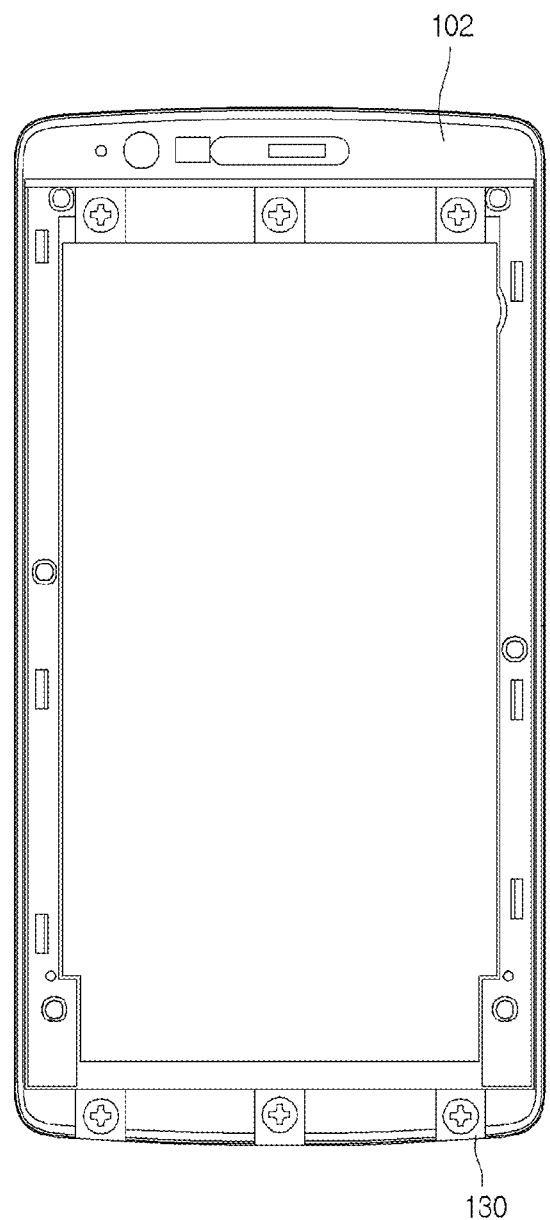

[Figure 14]
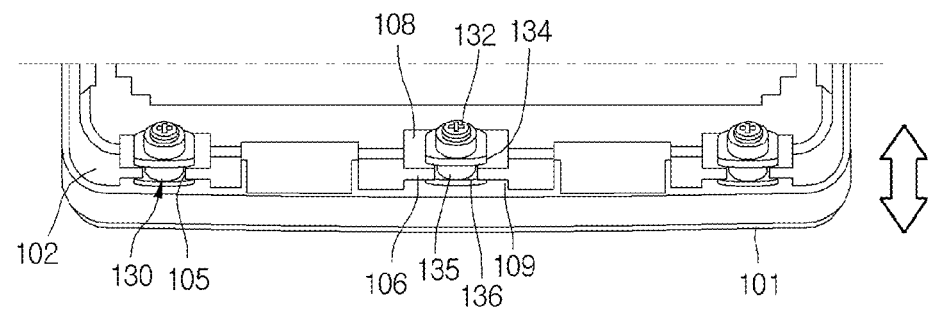
[Figure 15]
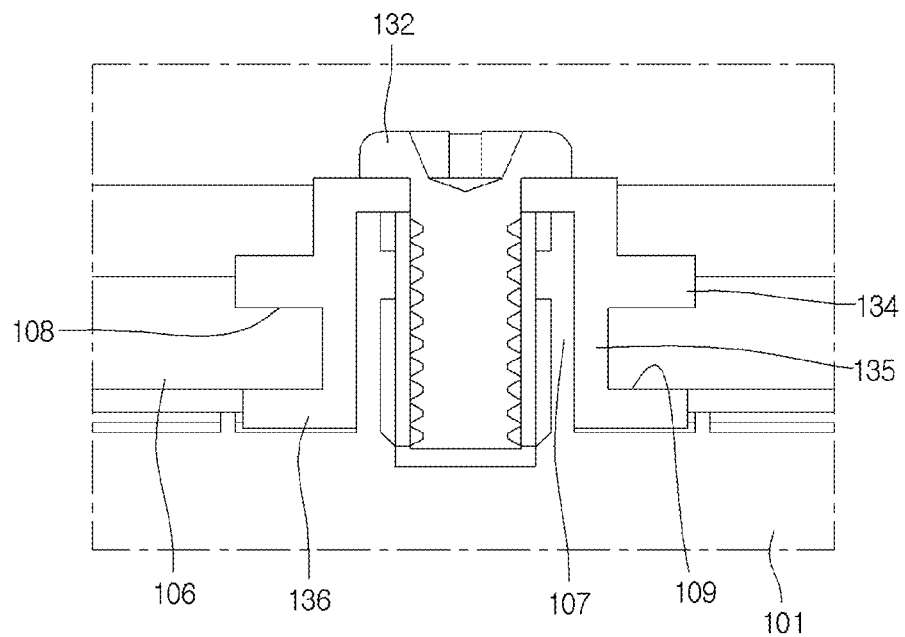

[Figure 16]
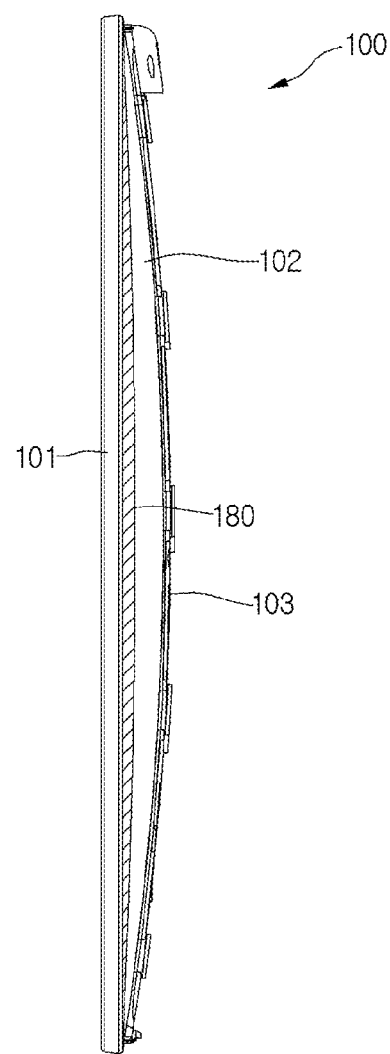

【Figure 17】
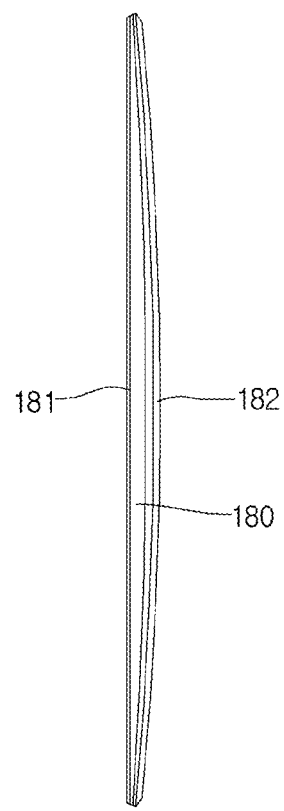

DEFORMABLE MOBILE TERMINAL

CROSS-REFERENCE TO RELATED APPLICATIONS

This application is the National Stage filing under 35 U.S.C. 371 of International Application No. PCT/KR2015/006203, filed on Jun. 18, 2015, which claims the benefit of earlier filing date and right of priority to Korean Application No. 10-2014-0134923, filed on Oct. 7, 2014, the contents of which are all incorporated by reference herein in their entirety.

TECHNICAL FIELD

The present disclosure relates to a mobile terminal.

BACKGROUND ART

Terminals may be classified into mobile/portable terminals and stationary terminals according to whether the terminals are portable. Also, the mobile/portable terminals may be classified into handheld terminals and vehicle mounted terminals according to whether the terminals are directly portable by a user.

Such a mobile terminal is diversified in function. For example, the mobile terminal may have data and voice communication, photograph shooting using a camera, video shooting, voice recording, music file playing using a speaker system, and outputting of an image or video on a display unit. An electronic game play function and multimedia player function may be added to some terminals. Particularly, the mobile terminal may receive a multicast signal that provides visual contents such as broadcasting and video or television program.

As described above, as the terminal is diversified in function, the terminal is being realized as the form of multimedia player having multiple functions such as, for example, photograph or video shooting, music or moving picture file playing, game, receiving of broadcasting, and the like.

Also, to support the terminal and increase functions, improvement in structural portions of the terminal may be considered.

Since the mobile terminal has to consider mobility or portability, space assignment for user's interface such as a display or keypad may be limited. Thus, to efficiently utilize the various functions provided in the mobile terminal and change in size of the mobile terminal as necessary, studies with respect to flexible displays formed of a foldable or bendable material are being progressed. Such a flexible display may represent a display that is foldable or bendable such as a paper or is rollable such as a scroll, unlike a flat panel display that is generally used.

However, a technology in which a display is bendable or foldable according to user's intention has not been generalized to this day. A mobile terminal having a curved display structure in which a display is maintained in a curved state is being released.

Thus, a mobile terminal that is deformable in shape of a display according to user's convenience is required.

DISCLOSURE

Technical Problem

Embodiments provide a mobile terminal having a display structure that is deformable in shape of a display according to user's intention.

Technical Solution

In one embodiment, a mobile terminal includes: a display unit outputting an image; a front case seated on a front surface of the display unit; a rear case disposed at a rear side of the front case; and a leaf spring disposed between the front case and the rear case to provide an elastic force to the front case, thereby changing a curvature of the front case.

The leaf spring may have upper and lower portions coupled to the rear case and a central portion coupled to the front case, and each of the display unit and the front case may change in curvature by the change in curvature of the leaf spring.

In a state where the display unit and the front case are curved backward, when a central portion of the front case is pulled forward, the leaf spring may be deformed from a curved state to a flat state.

In a state where the display unit and the front case are flat, when a central portion of the display unit is pushed, the leaf spring may be deformed to the curved state, and each of the display unit and the front case may be deformed to the curved state by the deformation of the leaf spring.

The leaf spring may include: a first coupling hole defined in each of upper and lower edges thereof; and a second coupling hole defined in a central portion thereof.

The first and second coupling holes may be provided in plurality in a width direction of the leaf spring.

Each of the first and second coupling holes may be a long hole that extends in a longitudinal direction of the leaf spring.

The first coupling hole may include: a first fixing part; and a second fixing part extending from one side of the first fixing part in the longitudinal direction of the leaf spring, the second fixing part having a width less than that of the first fixing part, and when the leaf spring is in the flat state, the coupling member may be disposed at the second fixing part.

The mobile terminal may further include a rear cover covering a back surface of the rear case, the rear cover being detachably coupled to a side surface of the front case.

A coupling groove may be defined in each of side surfaces of upper and lower ends of the front case, a coupling protrusion inserted into the coupling groove may be disposed on each of upper and lower ends of a front surface of the rear cover, a bottom part of the coupling groove may be recessed in a curved shape, and an end of the coupling protrusion may be rounded.

The mobile terminal may further include: a coupling boss protruding from each of edges of upper and lower portions of a back surface of the front case; a combination member inserted into an outer circumferential surface of the coupling boss; and a coupling member inserted into the coupling boss by passing through the combination member.

The rear case may include: a first seat groove recessed to a predetermined depth backward from a front surface of each of upper and lower edges thereof; a second seat groove recessed to a predetermined depth forward from a rear surface of each of the upper and lower edges thereof; and a fitting groove recessed to a predetermined depth from each of upper and lower ends thereof in a central direction to connect the first seat groove to the second seat groove.

The combination member may include: a body part covered on an outer circumferential surface of the coupling boss; a first hook part extending from an outer circumferential surface of the body part in a radius direction of the body part, the first hook being seated on the first seat groove; and a second hook part extending from the outer circumferential surface of the body part 135 in the radius direction of the body part and disposed at a point that is spaced apart from the first hook part in a longitudinal direction of the body part, the second hook part being seated on the second seat groove, wherein the body part may be inserted into the fitting groove, and the coupling member may be inserted into the coupling boss by passing through the body part.

The body part may move within the fitting groove when the front case is deformed.

The display unit may include a flexible display panel that is deformable by an external force.

The mobile terminal may further include a pair of shield parts connecting both side surfaces of the front case to both side surfaces of the rear case, respectively.

Each of the shield parts may include a corrugated plate that is bent several times in a zigzag shape.

Each of the shield parts may include a flexible band.

Advantageous Effects

The mobile terminal according to the embodiments may have the following effects.

First, the display unit may move forward and backward by using the elastic force of the leaf spring to acquire the display shape having various curvatures.

Second, the front case and the rear case may mutually move through the curved surface hook structures of the front case and the rear case.

Third, since the front case and the rear case are screw-coupled to each other through a flow groove, when the front case is deformed, the front case may be movable with respect to the rear case.

Fourth, the shield part may be disposed between the front case and the rear case to shield the gap generated when the front case is deformed.

DESCRIPTION OF DRAWINGS

FIG. 1 is a front perspective view of a mobile terminal according to an embodiment.

FIG. 2 is a rear perspective view of the mobile terminal according to an embodiment.

FIG. 3 is a conceptual view for explaining another example of a deformable mobile terminal according to an embodiment.

FIG. 4 is an exploded perspective of the mobile terminal according to an embodiment.

FIG. 5 is a front perspective view of a left spring according to an embodiment.

FIG. 6 is a cross-sectional view of a state in which a screw is coupled to a coupling groove according to an embodiment.

FIG. 7 is a cross-sectional view of a state in which the leaf spring is coupled to a front surface of a rear case according to an embodiment.

FIG. 8 is a cross-sectional view of a state in which a front case and the rear case are coupled to each other according to an embodiment.

FIG. 9 is a perspective view of the rear case in a sate where the leaf spring is maintained in a flat sate according to an embodiment.

FIG. 10 is a cross-sectional view of a state in which the front case and the rear case are coupled to each other in a deformed state according to an embodiment.

FIG. 11 is a perspective view of the mobile terminal in a state where an area of the display unit is flat according to an embodiment.

FIG. 12 is a perspective view of a state in which the front case and a rear cover are coupled to each other an embodiment.

FIG. 13 is a front cross-sectional view of the front case according to an embodiment.

FIG. 14 is a perspective view for explaining the coupling between the front case and the rear case according to an embodiment.

FIG. 15 is a cross-sectional view of a state in which the front case and the rear case are coupled to each other according to an embodiment.

FIG. 16 is a cross-sectional view illustrating a side surface of the mobile terminal including a shield part according to an embodiment.

FIG. 17 is a perspective view of the shield part according to an embodiment.

MODE FOR INVENTION

Hereinafter, embodiments disclosed in this specification is described with reference to the accompanying drawings, and the same or corresponding components are given with the same drawing number regardless of reference number, and their duplicated description will be omitted. Furthermore, terms, such as a "module" ad a "unit", are used for convenience of description, and they do not have different meanings or functions in themselves. Moreover, detailed descriptions related to well-known functions or configurations will be ruled out in order not to unnecessarily obscure subject matters of the present disclosure. However, this does not limit the present disclosure within specific embodiments and it should be understood that the present disclosure covers all the modifications, equivalents, and replacements within the idea and technical scope of the present disclosure.

FIG. 1 is a front perspective view of a mobile terminal according to an embodiment, and FIG. 2 is a rear perspective view of the mobile terminal according to an embodiment.

Referring to FIGS. 1 and 2, a mobile terminal 100 disclosed herein includes a bar-shaped terminal body of which a central portion is curved to a back surface thereof. However, the present disclosure is not limited thereto. For example, the mobile terminal according to an embodiment may be applied to various structures such as a watch type, a clip type, a glass type, a folding type in which at least two bodies are relative-movably coupled to each other, a flip type, a slide type, a swing type, a swivel type, and the like. A specific type of mobile terminals or description with respect to the specific type of mobile terminals may be generally applied to different types of mobile terminals.

Here, a terminal body may be understood as a concept that is called at least one assembly of the mobile terminal 100.

The mobile terminal 100 includes a case (for example, a frame, a housing, and a cover) defining an outer appearance thereof. As illustrated in FIGS. 1 and 2, the mobile terminal 100 may include a front case 101 and a rear case 102. Various electronic components may be disposed in an inner space that is defined by coupling the front case 101 and the rear case 102. At least one middle case may be additionally disposed between the front case 101 and the rear case 102.

A display unit 151 is disposed on a front surface of the terminal body to output information. As illustrated in FIGS. 1 and 2, a window 151a of the display unit 151 may be mounted on the front case 101 to define the front surface of the terminal body together with the front case 101.

In some cases, electronic components may be mounted on the rear case 102. The electronic component that is capable of being mounted on the rear case 102 may include a detachable battery, an identification module, and a memory card. In this case, a rear cover 103 for covering the mounted electronic components may be detachably coupled to the rear case 102. Thus, when the rear cover 103 is separated from the rear case 102, the electronic components mounted on the rear case 102 are exposed to the outside.

As illustrated in FIGS. 1 and 2, when the rear cover 103 is coupled to the rear case 102, a portion of a side surface of the rear case 102 may be exposed. In some cases, when the rear cover 103 is coupled to the rear case 102, the rear case 102 may be completely covered by the rear cover 103. An opening for exposing a camera 121b or an acoustic output unit 152b may be defined in the rear cover 103.

Each of the cases 101, 102, and 103 may be injection-molded by using a synthetic resin or be formed of metal, for example, stainless steel (STS), aluminum (Al), titanium (Ti), and the like.

In the mobile terminal 100, unlike that the plurality of cases define the inner space for accommodating the various electronic components, the inner space may be defined by using one case. In this case, the mobile terminal 100 including a unibody in which the synthetic resin or metal is continuously formed from a side surface to a back surface may be realized.

The mobile terminal 100 may include a waterproof part (not shown) for preventing water from being permeated into the terminal body. For example, the waterproof part may include a waterproof member that is disposed between the window 151a and the front case 101, between the front case 101 and the rear case 102, or between the rear case 102 and the rear cover 103 to seal the inner space when the above-described components are coupled to each other.

The mobile terminal 100 may include the display unit 151, first and second acoustic output units 152a and 152b, a proximity sensor 141, an illumination sensor 142, an optical output unit 154, first and second cameras 121a and 121b, first and second manipulation units 123a and 123b, a microphone 122, and an interface 160.

Hereinafter, as illustrated in FIGS. 1 and 2, a structure in which the display unit 151, the first acoustic output unit 152a, the proximity sensor 141, the illumination sensor 142, the optical output unit 154, the first camera 121a, and the first manipulation unit 123a are disposed on the front surface of the terminal, and the second manipulation unit 123b, the microphone 122, and the interface 160 may be disposed on the side surface of the terminal body is described as an example.

However, the components are not limited to the above-described example. As necessary, each of the components may be omitted, replaced, or disposed on the other surface. For example, the first manipulation unit 123a may not be disposed on the front surface of the terminal body, and the second acoustic output unit 152b may not be disposed the rear surface of the terminal body, but be disposed on the side surface of the terminal body.

The display unit 151 displays (outputs) information that is processed in the mobile terminal 100. For example, the display unit 151 may display execution screen information driven in the mobile terminal 100 or user interface (UI) or graphic user interface (GUI) information according to the execution screen.

The display unit 151 may include at least one of a liquid crystal display (LCD), a thin film transistor-liquid crystal display (TFT LCD), an organic light-emitting diode (OLED), a flexible display, a 3D display, and an E-ink display.

Hereinafter, the flexible display that is deformable by an external force will be described as an example of the display unit 151.

Also, at least two display units 151 may be provided according to the realization configuration of the mobile terminal 100. In this case, in the mobile terminal 100, the plurality of display units may be disposed on one surface so as to be separated from each other or be integrally disposed on the one surface. Also, the display units may be disposed on surfaces different from each other.

The display unit 151 may receive a control command in a touch manner or include a touch sensor for detecting touch on the display unit 151. Thus, when the touch is performed on the display unit 151, the touch sensor may detect the touch, and a control unit may generate a control command corresponding to the touch according to the touch on the display unit 151. Contents inputted by the touch manner may include characters or figures or menu items that are capable of being indicated or designated in various modes.

The touch sensor may has a film shape including a touch pattern and be disposed between the window 151a and a display (not shown) on a back surface of the window 151a. Alternatively, the touch sensor may be a metal wire that is directly patterned on the back surface of the window 151a. Alternatively, the touch sensor may be integrated with the display. For example, the touch sensor may be disposed on a substrate of the display or within the display.

As described above, the display unit 151 may form a touch screen together with the touch sensor. In this case, the touch screen may function as an input unit for a user. In some cases, the touch screen may perform at least a portion of functions of the first manipulation unit 123a.

The first acoustic output unit 152a may be realized as a receiver that transmits a call sound to a user's ear. The second acoustic output unit 152b may be realized in the form of a loud speaker that outputs various alarm sounds or multimedia play sounds.

An acoustic hole for releasing sounds generated from the first acoustic output unit 152a may be defined in the window 151a of the display unit 151. However, the present disclosure is not limited thereto. For example, the sounds may be released along an assembly gap (for example, a gap between the window 151a and the front case 101) between structures. In this case, the hole that is independently formed to output sounds may be unseen or hid, and thus the mobile terminal may be more simple in outer appearance.

The optical output unit 154 may output light for informing an occurrence of an event. Examples of the event may include message reception, call signal reception, unanswered call, alarm, schedule notification, email reception, information reception through application. The control unit may control the optical output unit 154 to stop the output of the light when the user's event confirmation is detected.

The first camera 121a processes an image frame of a static image or moving picture, which is obtained by an image sensor in a photograph mode or videotelephony mode. The processed image frame may be displayed on the display unit 151 and then stored in a memory.

The first and second manipulation units 123a and 123b may be one example of the user input unit that is manipulated to receive a command for controlling an operation of the mobile terminal 100 and be called a manipulation portion. The first and second manipulation units 123a and 123b may be adopted in various tactile manners in which a manipulation unit is capable of being manipulated to receive tactile feels such as touch, push, scroll, and the like. Also, the first and second manipulation units 123a and 123b may be adopted in a manner in which a manipulation unit is manipulated without tactile feel of the user through proximity touch, hovering, and the like.

In this drawing, although the first manipulation unit 123a is provided as a touch key, the present disclosure is not limited thereto. For example, the first manipulation unit 123a may be provided as a mechanical key or a combination of the touch key and the mechanical key.

Contents inputted by the first and second manipulation units 123a and 123b may be various set. For example, the first manipulation unit 123a may receive commands such as menu, home key, cancel, and search, and the second manipulation unit 123b may receive commands for adjustment in intensity of sound outputted from the first and second acoustic output units 152a and 152b and conversion into a touch recognition mode of the display unit 151.

A rear surface input unit (not shown) may be disposed on the rear surface of the terminal body as the other example of the user input unit. The rear surface input unit may be manipulated to receive a command for controlling the operation of the mobile terminal 100. Here, the input contents may be variously set. For example, the rear surface input unit may receive commands such as turn on/off of a power, start, end, and scroll and commands such as adjustment in intensity of sound outputted from the first and second acoustic output units 152a and 152b and conversion into a touch recognition mode of the display unit 151. The rear surface input unit may be realized in a shape in which the touch input, the push input, or a combination thereof is enabled.

The rear surface input unit may be disposed to overlap the display unit 151 disposed on the front surface of the terminal body in a thickness of the terminal body. For example, when the user holds the terminal body by using one hand, the rear surface input unit may be disposed on an upper end of the rear surface of the terminal input unit so that the user manipulates the rear surface input unit by using an index finger. However, the present disclosure is not limited thereto. For example, the rear surface input unit may be changed in position.

When the rear surface input unit is disposed on the rear surface of the terminal body, a new user interface using the rear surface input unit may be realized. Also, the touch screen or rear surface input unit, which are described above may perform at least a portion of the functions of the first manipulation unit 123a disposed on the front surface of the terminal body. As a result, when the first manipulation unit 123a is not disposed on the front surface of the terminal body, the touch screen or rear surface input unit may have a screen size greater than that of the display unit 151.

The mobile terminal 100 may include a fingerprint recognition sensor for recognizing a fingerprint of the user. The control unit may use fingerprint information detected through the fingerprint recognition sensor as an identification unit. The fingerprint recognition sensor may be built in the display unit 151 or the user input unit.

The microphone 122 may receive user's voice and other sounds. The microphone 122 may be provided in plurality to receive stereo sounds.

The interface 160 may serve as a path for connecting the mobile terminal 100 to an external device. For example, the interface 160 may include at least one of a connection terminal for connecting the other device (e.g., an earphone, an external speaker, and the like), a port for near field communication (e.g., an infrared port (IrDA port), Bluetooth port, wireless LAN port, and the like), and a power supply terminal for supplying a power to the mobile terminal 100. The interface 160 may be realized in the form of a socket that is capable of accommodating a subscriber identification module (SIM) or user identity module (UIM) and an external card such as a memory card for storing information.

The second camera 121b may be disposed on the rear surface of the terminal body. In this case, the second camera 121b may photograph a side substantially opposite to that photographed by the first camera 121a.

The second camera 121b may include a plurality of lenses that are arranged along at least one line. The plurality of lenses may be arranged in a matrix form. The camera may be called an "array camera". When the second camera 121b is provided as the array camera, the second camera 121b may photograph a subject in various manners by using the plurality of lenses to acquire more improved images.

The flash 124 may be disposed adjacent to the second camera 121b. The flash 124 may irradiate light toward a subject when the subject is photographed by using the second camera 121b.

The second acoustic output unit 152b may be additionally disposed on the terminal body. The second acoustic output unit 152b may perform a stereo function together with the first acoustic output unit 152a. When making a call, the second acoustic output unit 152 may be used for realizing a speakerphone mode.

At least one antenna for wireless communication may be disposed on the terminal body. The antenna may be built in the terminal body or disposed on the case. For example, the antenna constituting a portion of a communication receiving module may be withdrawably disposed in the terminal body. Alternatively, the antenna may be provided in a film type and be attached to an inner side surface of the rear cover 103. Also, a case formed of a conductive material may function as the antenna.

The power supply unit for supplying a power to the mobile terminal 100 is disposed on the terminal body. The power supply unit may be built in the terminal body or include a battery 191 that is detachably disposed on an outer portion of the terminal body.

The battery 191 may receive a power through a power cable connected to the interface 160. Also, the battery 191 may be wirelessly charged through a wireless charging device. The wireless charging may be realized by a magnetic induction manner or resonant manner (magnetic resonance manner).

In the drawings, the rear cover 103 is coupled to the rear case 102 to cover the battery 191, thereby preventing the battery 192 from being separated and protecting the battery 192 against an external impact and foreign substances. When the battery is detachably disposed on the terminal body, the rear cover 103 may be detachably coupled to the rear case 102.

An accessory for protecting the outer appearance of the mobile terminal 100 or assisting or expanding the functions of the mobile terminal 100 may be additionally disposed on the mobile terminal 100. An example of the accessory may include a cover or pouch for covering or accommodating at least one surface of the mobile terminal 100. The cover or pouch may communicate with the display unit 151 to expand the functions of the mobile terminal 100. Another example of the accessory may include a touch pen for assisting or expanding a touch input on the touch screen.

FIG. 3 is a conceptual view for explaining another example of a deformable mobile terminal according to an embodiment.

As illustrated in FIG. 3, a display unit 251 may be deformable by an external force. The deformation may include at least one of bending, curving, folding, twisting, and rolling. The deformable display unit 251 may be called a "flexible display unit". Here, the flexible display unit 251 may include all of a general flexible display, an e-paper, and a combination thereof. In general, the mobile terminal 200 may have the features of the mobile terminal 100 of FIGS. 1 and 2 or features similar to those of the mobile terminal 100.

The general flexible display represents a display that has the features of the existing flat panel display, is manufactured on a thin and flexible substrate so that the display is bent, curved, folded, twisted, or rolled such as a paper, is lightweight, and is not breakable.

Also, the e-paper may be manufactured by display technologies to which features of general ink are applied. The e-paper may be different from the existing flat panel display in that reflection light is used. Information of the e-paper may change by using a twist ball or electrophoresis using a capsule.

In a state where the flexible display unit 251 is not deformed (for example, the flexible display unit 251 has an infinite curvature radius, and hereinafter, referred to as a first state), a display area of the flexible display unit 251 may be flat. In a state where the first state is deformed by an external force (for example, the flexible display unit 251 has a limited curvature radius, and hereinafter, referred to as a second state), the display area may have a curved surface. As illustrated in FIG. 3, information displayed in the second state may be visual information that is outputted on the curved surface. The visual information may be realized by independently controlling emission of sub-pixels arranged in the matrix form. The sub-pixel may represent a minimum unit for realizing one color.

The flexible display unit 251 may not be flat, but be curved (for example, curved vertically or horizontally) to the first state. In this case, when an external force is applied to the flexible display unit 251, the flexible display unit 251 may be deformed to a flat state (or to be less curved) or to be more curved.

The flexible display unit 251 may realize a flexible touch screen by being combined with the touch sensor. When a touch input is performed on the flexible touch screen, a control unit may perform control corresponding to the touch input. The flexible touch screen may detect the touch input in the second state as well as the first state.

The mobile terminal 200 according to a modified example may include a deformation detection unit for detecting the deformation of the flexible display unit 251.

The deformation detection unit may be provided on the flexible display unit 251 or a case 210 to detect information with respect to the deformation of the flexible display unit 251. Here, the information with respect to the deformation may include a deformed direction, a deformed degree, a deformed position, a deformed time, and an acceleration at which the deformed flexible display unit 251 is restored. In addition, the information may be various information that are detected by the curving of the flexible display unit 251.

Also, the control unit may change the information displayed on the flexible display unit 251 or generate a control signal for controlling the functions of the mobile terminal 200 on the basis of the information with respect to the deformation of the flexible display unit 251, which is detected by the deformation detection unit.

The mobile terminal 200 according to the modified example may include a case 201 for accommodating the flexible display unit 251. The case 201 may be deformed together with the flexible display unit 251 by the external force in consideration of the features of the flexible display unit 251.

Furthermore, a battery (not shown) provided in the mobile terminal 200 may also be deformed together with the flexible display unit 251 by the external force in consideration of the features of the flexible display unit 251. A stack and folding manner in which battery cells are stacked upward may be applied to realize the battery.

The deformation of the flexible display unit 251 may be limited to only the external force. For example, when the flexible display unit 251 is in the first state, the flexible display unit 251 may be deformed to the second state by a command of a user or application.

FIG. 4 is an exploded perspective of the mobile terminal according to an embodiment.

Referring to FIG. 4, as described above, the mobile terminal 100 includes a display unit 151 for outputting an image, a front case 101 seated on a front surface of the display unit 151, a rear case 102 on which a board 140 on which electronic components required for driving the mobile terminal 100 are mounted and a battery 191 are mounted, a leaf spring 110 disposed between the front case 101 and the rear case 102 to provide an elastic force to the front case 101, thereby changing a curvature of the front case 101, and a rear cover 103 detachably coupled to a rear surface of the mobile terminal 100 to cover the electronic components mounted within the mobile terminal 100.

The rear cover 103 may have exposing holes 103a, 103b, and 103c for exposing an acoustic output unit 152b and a flash 124 to the outside of the rear cover 103.

The front case 101 and the rear case 102 may be coupled to each other through a screw or a hook structure disposed on an outer portion of the case. Also, the rear cover 103 may be detachably coupled to the rear case 102 so that the user replaces the battery 191.

A shield part 180 for shielding a gap generated between the front case 101 and the rare case 102 in a state where the display unit 151 and the front case 101 are not deformed (i.e., have infinite curvature radius) may be disposed between the front case 101 and the rear case 102. A structure and operation of the shield part 180 will be described below.

As described above, since the mobile terminal 100 includes a bar-shaped terminal body of which a central portion is curved toward a back surface thereof, each of the components disposed from the display unit 151 to the rear cover 103 may have a shape of which a central portion is curved toward a back surface thereof. Here, the display unit 151, the front case 101, and the leaf spring 110 may be formed of a material is deformable by an external force. Other components except for the display unit 151, the front case 101, and the leaf spring 110 may be formed of a plastic deformable material having a curvature. Also, all of components defining the outer appearance of the mobile terminal 100 may be formed of an elastically deformable material.

The leaf spring 110 has upper and lower ends that are coupled to the rear case 102 and a central portion coupled to the front case 101. Thus, when the leaf spring 110 changes in curvature, each of the display unit 151 and the front case 101 may change in curvature. This will be described later in detail.

Hereinafter, a component for deforming the display unit 151 that is a main part of the current embodiment will be described.

FIG. 5 is a front perspective view of a left spring according to an embodiment, FIG. 6 is a cross-sectional view of a state in which a screw is coupled to a coupling groove according to an embodiment, FIG. 7 is a cross-sectional view of a state in which the leaf spring is coupled to a front surface of a rear case according to an embodiment, and FIG. 8 is a cross-sectional view of a state in which a front case and the rear case are coupled to each other according to an embodiment.

Referring to FIGS. 5 to 7, the leaf spring 110 includes a main body 110a having a plate shape with an elastic force. In detail, the leaf spring 110 protrudes backward from a central portion thereof as illustrated in FIG. 5. Here, when the leaf spring 110 is curved or twisted, the central portion of the leaf spring 110 protrudes forward or backward. Also, both surfaces of the leaf spring 110 may provide an elastic force in a direction that is curved to have a curvature.

Thus, the leaf spring 110 may provide an elastic force by which the upper and lower ends of the leaf spring 110 are curved to approach each other in one or the other direction.

Coupling holes 111 and 115 passing through the body 110a are defined in the leaf spring 110. The coupling holes 111 and 115 include a first coupling hole 111 coupled to the front case 101 and a second coupling hole 115 coupled to the rear case 102.

As illustrated in FIG. 5, the first coupling hole 111 may be defined in each of upper and lower edges of the main body 110a, and the second coupling hole 115 may be defined in a central portion of the main body 110a. The number of first and second coupling holes 111 and 115 is not limited. The first and second coupling holes 111 and 115 may be defined in plurality in a width direction of the leaf spring 110.

Each of the first and second coupling holes 111 and 115 may be a long hole that extends in a longitudinal direction of the leaf spring. In detail, the first coupling hole 111 includes a first fixing part 113 having a circular shape and a second fixing part 112 extending from one side of the first fixing part 113 in the longitudinal direction of the leaf spring 110. In detail, the first fixing part 113 is disposed adjacent to an end of the leaf spring and has a circular shape with an area less than that of a cross-sectional area of the coupling member 126, and the second fixing part 112 extends from one side of the first fixing part 113 in the longitudinal direction and has a width less than that of the first fixing part 113.

Also, a coupling member 126 may be inserted into the coupling holes 112 and 115 to couple the leaf spring 110 to the front case 101 and the rear case 102. For example, the coupling member 126 may be a screw.

As illustrated in FIG. 7, the back surface of the leaf spring 110 is coupled to a font surface of the rear case 102 through the first coupling hole 111.

Also, as illustrated in FIG. 8, a front surface 118 of the leaf spring 110 is coupled to a back surface of the front case 101 through the second coupling hole 115. That is, the front case 101 and the leaf spring 110 may be coupled to each other by inserting the coupling member 126 from the back surface of the leaf spring 110 toward the back surface of the front case 101.

Hereinafter, deformation operations of the leaf spring 110 and the front case 101 will be described.

FIG. 9 is a perspective view of the rear case in a sate where the leaf spring is maintained in a flat sate according to an embodiment, FIG. 10 is a cross-sectional view of a state in which the front case and the rear case are coupled to each other in a deformed state according to an embodiment, and FIG. 11 is a perspective view of the mobile terminal in a state where an area of the display unit is flat according to an embodiment.

In this specification, the state in which the display unit 151 is not deformed may represent a state in which the display unit 151 has a limited curvature radius, i.e., a state in which the display area is curved. Also, the state in which the display unit 151 is deformed may represent a state in which the display unit 151 has an infinite curvature radius, i.e., a state in which the display area is flat.

When the mobile terminal 100 is not deformed, the display unit 151 may be maintained in the curved state as illustrated in FIG. 1. Here, when the user applies an external force to pull the front case 101 with respect to the rear case 102, the leaf spring 110 may be maintained in the flat state as illustrated in FIG. 9. In detail, since the front case 101 and the leaf spring 110 are coupled to each other through the second coupling hole 115, the central portion of the leaf spring 110 may be pulled forward by the external force by which the central portion of the front case 101 is pulled forward, and thus, the leaf spring 110 may become to the flat state.

That is, when the central portion of the front case 101 is pulled forward in the state where the display unit 151 and the front case 101 are curved backward, the leaf spring 110 may change from the curved state to the flat state.

Thus, the coupling member 126 disposed in the first fixing part 113 of the first coupling hole 111 may be disposed in the second fixing part 112 by the deformation of the leaf spring 110 as illustrated in FIG. 9. Also, since the leaf spring 110 is deformed, the coupling member 126 inserted into the second coupling hole 115 may change in position in the second coupling hole 115. Thus, the user's external force applied to the front case 101 may be transmitted to the leaf spring 110. That is to say, as illustrated in FIG. 7, when the leaf spring 110 is in the curved state, the coupling member 126 may be disposed in the first fixing part 113. On the other hand, when the leaf spring 110 is in the flat state, the coupling member 126 may be disposed in the second fixing part 112. Thus, as the leaf spring 110 is deformed, the coupling member 126 may change in position.

Also, when the leaf spring 110 is in the flat state, a force for restoring the leaf spring 110 to the curved state may act by the elastic force thereof. Thus, when the front case 101 become to the flat state, the coupling member 126 coupled to the second coupling hole 115 holds the central portion of the leaf spring 110. As a result, the front case 101, the display unit 151, and the leaf spring 110 may be maintained in the flat state.

If the user intends to use the display unit 151 having the curved state, the user may push the central portion of the display unit 151 to allow the display unit 151, the front case 101, and the leaf spring 110 to return to the curved state.

That is, when the central portion of the display unit 151 is pushed in the state where the display unit 151 and the front case 101 are in the flat state, the leaf spring 110 may be curved. Thus, as the leaf spring 110 is deformed, the display unit 151 and the front case 101 may be curved.

Also, since the upper and lower ends of the front case 101 are coupled to the rear case 102 and the rear cover 103, it may prevent the central portion of the display unit 151 from further protruding forward in the flat state.

FIG. 12 is a perspective view of a state in which the front case and a rear cover are coupled to each other an embodiment.

Referring to FIG. 12, the front case 101 and the rear cover 103 may be coupled to each other through hook coupling. In detail, a coupling groove 101c is defined in each of side surfaces of upper and lower ends of the front case 101, and a coupling protrusion 103c inserted into the coupling groove 101c is disposed on each of upper and lower ends of the rear cover 103.

Here, a bottom part of the coupling groove 101c may be recessed in a curved shape, and an end of the coupling protrusion 103c may be rounded.

When the front case 101 is deformed to the flat state, a force for pushing the upper and lower ends of the front case upward and downward may be generated. Thus, the front case 101 coupled to the rear cover 103 through a curved coupling structure may be movable. That is, the front case 101 and the rear cover 103 may be coupled to each other through a hook coupling structure in which the front case 101 and the rear cover 103 are fixed to each other and movable with respect to each other.

FIG. 13 is a front cross-sectional view of the front case according to an embodiment, FIG. 14 is a perspective view for explaining the coupling between the front case and the rear case according to an embodiment, and FIG. 15 is a cross-sectional view of a state in which the front case and the rear case are coupled to each other according to an embodiment.

Referring to FIGS. 13 to 15, the front case 101 and the rear case 102 may be coupled to each other through a combination member 130 in addition to the coupling of the leaf spring 110.

As illustrated in FIG. 13, upper ends of the front case 101 and the rear case 102 may contact each other to form three coupling structures, and lower ends of the front case 101 and the rear case 102 may contact each other to form three coupling structures. However, the number of coupling structures may be limited to the above-described number and also variously change.

A first seat groove 109 that is recessed to a predetermined depth backward from the front surface of each of upper and lower edges of the rear case 102 and a second seat groove 108 that is recessed to a predetermined depth forward from the rear surface of each of upper and lower edges of the rear case 102 are defined in the rear case 102. Also, a fitting groove 105 that is recessed to a predetermined depth in a central direction from each of upper and rear ends of the rear case 102 to connect the first seat groove 109 to the second seat groove 108 is defined in the rear case 102.

Also, a coupling boss 107 protruding from each of upper and lower edges of the back surface of the front case 101 is disposed on the front case 101. The combination member 130 is inserted into an outer circumferential surface of the coupling boss 107.

A coupling member 132 inserted into the coupling boss 107 by passing through the combination member 130 is disposed on the combination member 130.

In detail, the combination member 130 includes a body part 135 covered on an outer circumferential surface of the coupling boss 107, a first hook part 136 extending from an outer circumferential surface of the body part 135 in a radius direction of the body part 135 and seated on the first seat groove 109, and a second hook part 134 extending from the outer circumferential surface of the body part 135 in the radius direction of the body part 135, disposed at a point that is spaced apart from the first hook part 136 in a longitudinal direction of the body part 135, and seated on the second seat groove 108. Also, since the body part 135 is inserted into the fitting groove 105, and the coupling member 132 is inserted into the coupling boss 107 by passing through the body part 135, the front case 101 and the rear case 102 may be coupled to each other.

Also, the body part 135 may be movable within the fitting groove 105 as the front case 101 is deformed. That is, the first hook part 136 may have a cross-sectional area less than that of the first seat groove 109 so that the first hook part 136 is movable in the first seat groove 109. Similarly, the second hook part 134 may also have a cross-sectional area less than that of the second seat groove 108.

In detail, when the front case is deformed to the curved and flat states, the front case ad the rear case 102 may have lengths of the curved surfaces, which are equal to or different from each other. When the front case 101 is in the curved state, the curved surface of the front case 101 may have the same length as the rear case 102. When the front case 101 is in the flat state, each of the upper and lower ends of the front case 101 may increase in length and thus have a length greater than that of the rear case 102.

Thus, the body part 135 may be vertically movable within the fitting groove 105 as the front case 101 is deformed. Thus, the front case 101 may be movable with respect to the rear case 102.

FIG. 16 is a cross-sectional view illustrating a side surface of the mobile terminal including a shield part according to an embodiment, and FIG. 17 is a perspective view of the shield part according to an embodiment.

Referring to FIGS. 16 and 17, at least one shield part 180 disposed between the front case 101 and the rear case 102 to shield a gap generated between the front case 101 and the rear case 102 as the front case is deformed may be provided. The shield part 180 may connect both side surfaces of the front case 101 and the rear case 102 to each other and be provided in plurality.

In detail, the shield part 180 may have one side 181 coupled to each of both side ends of the back surface of the front case 101 and the other side 182 coupled to each of both side ends of the front surface of the rear case 102 facing both side ends of the back surface.

The shield part 180 may be a flexible corrugated plate that is bent several times in a band or zigzag shape. For example, when the shield part 180 is provided as the corrugated plate, a plurality of plates may be maintained in the folded state when the front case 101 is in the curved state. When the front case 101 is deformed to the flat state, the folded plates may be unfolded to shield the gap.

As illustrated in FIG. 11, when the front case 101 is deformed to the flat state, the central portion of the front case 101 is away from the rear case 102 to generate the gap. Thus, the shield part 180 may be disposed between the front case 101 and the rear case 102 to increase in length as the front case 101 is deformed, thereby shielding the inside of the mobile terminal 100. When the inside of the mobile terminal 100 is exposed to the outside, dusts may be introduced into the mobile terminal 100 to cause breakdown of the mobile terminal 100. Thus, the shield part 180 may be provided to prevent the foreign substances such as the dusts from being introduced into the mobile terminal 100.

The invention claimed is:
1. A mobile terminal comprising:
a display unit outputting an image;
a front case seated on a front surface of the display unit;
a rear case disposed at a rear side of the front case; and a leaf spring disposed between the front case and the rear case to provide an elastic force to the front case, thereby changing a curvature of the front case, wherein the leaf spring has upper and lower portions coupled to the rear case and a central portion coupled to the front case, and wherein each of the display unit and the front case changes in curvature by the change in curvature of the leaf spring.

2. The mobile terminal according to claim 1, wherein, in a state where the display unit and the front case are curved backward, when a central portion of the front case is pulled forward, the leaf spring is deformed from a curved state to a flat state.

3. The mobile terminal according to claim 1, wherein, in a state where the display unit and the front case are flat, when a central portion of the display unit is pushed, the leaf spring is deformed to the curved state, and each of the display unit and the front case is deformed to the curved state by the deformation of the leaf spring.

4. The mobile terminal according to claim 1, wherein the leaf spring comprises:

a first coupling hole defined in each of upper and lower edges thereof; and a second coupling hole defined in a central portion thereof.

5. The mobile terminal according to claim 4, wherein the first and second coupling holes are provided in plurality in a width direction of the leaf spring.

6. The mobile terminal according to claim 4, wherein each of the first and second coupling holes is a long hole that extends in a longitudinal direction of the leaf spring.

7. The mobile terminal according to claim 6, wherein the first coupling hole comprises:

a first fixing part; and a second fixing part extending from one side of the first fixing part in the longitudinal direction of the leaf spring, the second fixing part having a width less than that of the first fixing part, and when the leaf spring is in the flat state, the coupling member is disposed at the second fixing part.

8. The mobile terminal according to claim 4, wherein a coupling groove is defined in each of side surfaces of upper and lower ends of the front case, a coupling protrusion inserted into the coupling groove is disposed on each of upper and lower ends of a front surface of the rear cover, a bottom part of the coupling groove is recessed in a curved shape, and an end of the coupling protrusion is rounded.

9. The mobile terminal according to claim 1, further comprising a rear covering a back surface of the rear case, the rear cover being detachably coupled to a side surface of the front case.

10. The mobile terminal according to claim 1, further comprising:

a coupling boss protruding from each of edges of upper and lower portions of a back surface of the front case;

a combination member inserted into an outer circumferential surface of the coupling boss; and a coupling member inserted into the coupling boss by passing through the combination member.

11. The mobile terminal according to claim 10, wherein the rear case comprises:

a first seat groove recessed to a predetermined depth backward from a front surface of each of upper and lower edges thereof;

a second seat groove recessed to a predetermined depth forward from a rear surface of each of the upper and lower edges thereof; and a fitting groove recessed to a predetermined depth from each of upper and lower ends thereof in a central direction to connect the first seat groove to the second seat groove.

12. The mobile terminal according to claim 11, wherein the combination member comprises:

a body part covered on an outer circumferential surface of the coupling boss;

a first hook part extending from an outer circumferential surface of the body part in a radius direction of the body part, the first hook being seated on the first seat groove; and a second hook part extending from the outer circumferential surface of the body part 135 in the radius direction of the body part and disposed at a point that is spaced apart from the first hook part in a longitudinal direction of the body part, the second hook part being seated on the second seat groove, wherein the body part is inserted into the fitting groove, and the coupling member is inserted into the coupling boss by passing through the body part.

13. The mobile terminal according to claim 12, wherein the body part moves within the fitting groove when the front case is deformed.

14. The mobile terminal according to claim 1, wherein the display unit comprises a flexible display panel that is deformable by an external force.

15. The mobile terminal according to claim 1, further comprising a pair of shield parts connecting both side surfaces of the front case to both side surfaces of the rear case, respectively.

16. The mobile terminal according to claim 15, wherein each of the shield parts comprises a corrugated plate that is bent several times in a zigzag shape.

17. The mobile terminal according to claim 15, wherein each of the shield parts comprises a flexible band.

* * * * *